United States Patent [19]

Belleville et al.

[11] Patent Number: 4,683,098

[45] Date of Patent: Jul. 28, 1987

[54] APPARATUS FOR REDUCING WASTE IN A PLASTIC MOLD

[75] Inventors: Ernest L. Belleville, Barrington, N.H.; Laurent R. Gaudreau, S. Berwick, Me.

[73] Assignee: Ex-Cell-O Corporation, Walled Lake, Mich.

[21] Appl. No.: 859,531

[22] Filed: May 5, 1986

[51] Int. Cl.⁴ ............................................. B29C 39/00
[52] U.S. Cl. .................................... 264/302; 249/160; 264/327; 264/DIG. 60; 425/435; 425/441; 425/470; 425/451.9
[58] Field of Search ................ 249/160; 264/302, 245, 264/310, 327, DIG. 60; 425/130, 160, 161, 435, 451.9, 441, 470, 429

[56] References Cited

U.S. PATENT DOCUMENTS 4,217,325  8/1980  Colby .................................... 264/245
4,562,025 12/1985  Gray ........................ 264/DIG. 60 X
4,621,995 11/1986  Wensosky ............. 264/DIG. 60 X
4,623,503 11/1986  Anestis et al. ....................... 264/302

Primary Examiner—Charles Hart
Attorney, Agent, or Firm—John C. Evans

[57] ABSTRACT

Apparatus for reducing the waste area in a mold for an article molded from a heat-fusing material by a powdered vinyl process, has a mold box disposed adjacent the backside of a mold surface for controlling the temperature over respective first and second areas of the mold surface. The waste area elimination is accomplished by isolating and insulating the section of the mold defining the waste area. A kerf is cut into the mold around the waste area to isolate the area. The kerf is filled with castable silicone to insulate the waste area from the heated segments of the mold. To obtain the coating, the mold is filled with powdered vinyl and the excess material is removed from the mold by dumping the plastisol from the mold into a return tank.

8 Claims, 4 Drawing Figures

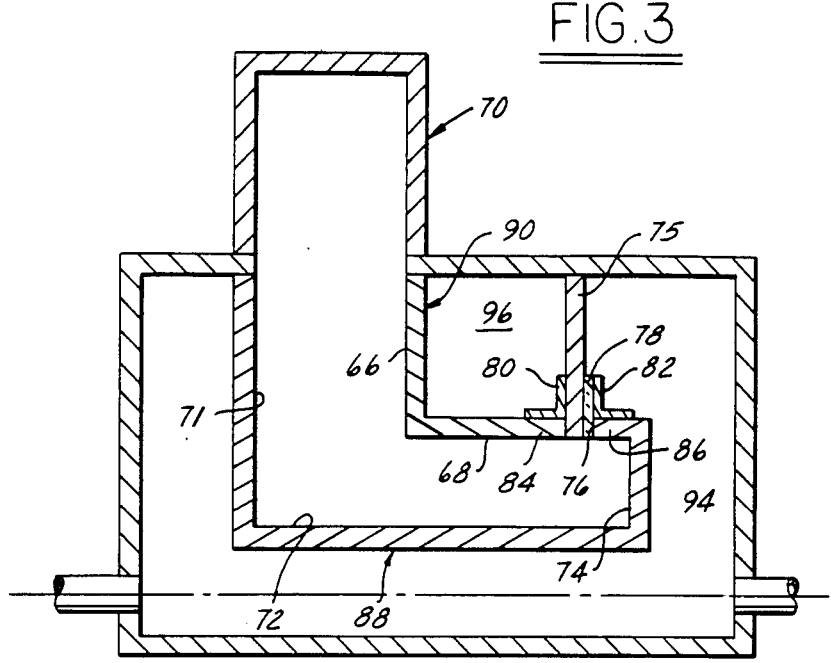
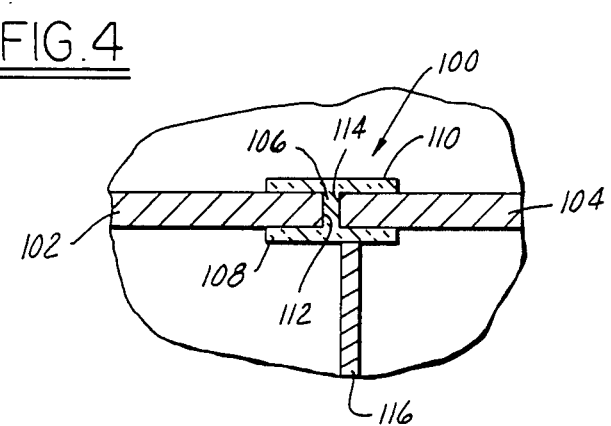

APPARATUS FOR REDUCING WASTE IN A PLASTIC MOLD

BACKGROUND OF THE INVENTION (1) Field of the Invention

This invention relates to an apparatus and a method for molding hollow thin-walled articles from a heat-fusing material such as vinyl plastisol.

Various vinyl plastisol compositions are known which can be used in various powdered vinyl molding processes. Typically, an open hollow mold is covered by dry plastisol and heat is applied to the mold surface and transferred to the dry plastisol to gel a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is poured out of the mold. In such processes, certain mold configurations may have surfaces thereon in which deposited material is later disposed of as scrap or trim waste.

(2) Description of the Prior Art

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by filling and emptying the mold. For example, automotive dashboard or instrument panel covers are made in this fashion and the molds frequently include details to define imitation stitching in the finished product as well as undercuts and other intricate detail. The very thin coating is first applied to conform to the mold and to prevent irregularities in the outer surface of the finished product. After this very thin coating is applied, the mold is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein the mold is heated by the exterior surfaces thereof being exposed to impinging streams of hot gas and, after the product is finished, the mold is cooled by being subject to cooling water from water spray nozzles, after which the fused finished article is stripped from the mold. In addition, an endless conveyor moves a plurality of molds through various stations in the performance of the method. Although the method and assembly shown in this patent have proven to be very satisfactory, there are disadvantages such as the open flame adjacent the molds, which produces the hot gas for heating of the molds, and the use of water or liquid for cooling the molds and which can be incompatible with the plastisol. Further, the assembly, because of its long conveyor and multiple molds, is suited for long runs of a plastisol of a particular color but is not well suited for short runs or quick or efficient changeovers.

Other methods of heating in a slush molding process have been utilized in the prior art; for example, the molds may be moved through heating ovens as exemplified in U.S. Pat. No. 3,002,230 granted to J. W. Stewart on Oct. 3, 1961. Alternatively, the molds may be subjected to induction heaters as exemplified in U.S. Pat. No. 3,315,016 granted to John M. Wersosky and Donald A. Moore on Apr. 18, 1967 and assigned to the assignee of the subject invention. Another method for heating the mold is exemplified in U.S. Pat. No. 3,680,629 granted to Laurent R. Gaudreau and Floyd E. McDowell on Aug. 1, 1972 and assigned to the assignee of the subject invention. That patent teaches the heating of a mold by incorporating tubes in the mold and flowing a heated fluid such as steam through the tubes for heating the mold. It is also known in the slush molding art to heat the mold by such tubes for conveying liquid through the mold wherein there are multiple circuits of the tubes with each circuit having an inlet and an outlet, but with each circuit subjected to the same fluid medium, i.e., the same temperature.

One of the problems associated with the prior art methods is that in many articles which are manufactured by slush molding where the mold is filled with plastisol, some areas of the filled mold are at a lower liquid level of the plastisol and are salvage or trim areas which are not used in the final product and therefore do not require the thickness of the other finished areas in the product. Yet, when the entire mold surface is heated uniformly the entire finished article has approximately the same thickness even though some areas are trim or non-usable. There is known in the slush molding art the technique of varying the thickness by heating different areas of the mold to a higher degree to increase the thickness of the article in certain areas. Such a technique is exemplified in U.S. Pat. No. 2,588,571 granted to Sydney Porter on Mar. 11, 1952. That patent discloses the technique of slush molding a boot by utilization of infrared lamp heating and shielding the heating from certain portions of the mold to prevent the build-up of the plastisol thickness and to increase the thickness of the sole of the boot by increased heating.

Another apparatus for controlling waste build-up on a mold is formed in a mold having first and second groups of liquid passages disposed adjacent the mold surface for controlling the temperature over respective first and second areas of the mold surface as set forth in U.S. Pat. No. 4,217,325 granted to D. E. Colby on Aug. 12, 1980 with a common assignee. The first group of liquid passages are disposed adjacent the first area of the mold surface where it is desired to increase the thickness of the finished article whereas the second group of passages is disposed adjacent the second area of the mold surface where the material in the finished article is scrapped and/or will be trimmed and therefore the desired thickness is desirably less. Both the first and second groups of passages are supplied with liquid to maintain the temperature of the first and second areas of the mold surface at a non-gelling temperature as liquid plastisol is disposed over the mold surface to define a coating or layer. This very thin coating of plastisol is applied to be free of surface blemishes. Thereafter, additional liquid plastisol is provided for increasing the thickness only over the first area of the mold surface. To accomplish this, the first group of passages is supplied with a liquid at a temperature higher than the non-gelling temperature of the liquid in the second group of passages for heating the first area of the mold surface to a higher temperature than the second area so as to gel the liquid plastisol over the first area of the mold surface which is heated with the heat supplied by the liquid in the first group of passages. After the desired gelled thickness is attained, all passages are supplied with liquid at a temperature sufficient to heat the first and second areas of the mold to a cure temperature for curing all of the plastisol. Accordingly, the finished article will have a greater thickness over the first area which defines the finished area of the article whereas the thickness of the article over the second area of the mold surface will be much thinner and define the scrap or trim areas. Consequently, significant amounts of material are saved.

Still another method of controlling the build-up of gelled material on a mold surface is set forth in U.S. Ser. No. 673,810 filed Nov. 21, 1984 for Gas Conditioned Modular Slush Molding Machine. In the '810 case, the control of waste build-up is accomplished by selective control of air flow from a heated plenum through elongated tubes with nozzles that impinge heated air onto exposed surfaces of the mold.

SUMMARY OF THE INVENTION

The subject invention provides an improved method and apparatus to control the thickness of an article made by a powdered or slush molding process in a mold having a mold box for gas heating and cooling first and second areas of the mold surface. The mold box is disposed adjacent a first area of the mold surface where it is desired to increase the thickness of the finished article. A second area of the mold surface where the material in the finished article is scrapped and/or will be trimmed and therefore the desired thickness is desirably less or not desired at all is isolated by a barrier of heat resistant material. The mold box is supplied with gas from a common inlet plenum through tube nozzles to maintain the temperature of the first area of the mold surface at a gelling temperature as plastisol is disposed over the mold surface to define a coating or layer. The heat resistant material prevents heat flow to the second portion so that only a very thin coating of plastisol is applied thereto and it does not adhere. The selective gas heating and thermal insulation avoid the need for expensive mold fabrication during production cycles while enabling selective control of mold heating to produce little or no gel build-up on the second region which represents scrap or trim areas in the molded article.

PRIOR ART STATEMENT

The U.S. Pat. No. 3,728,429 discussed above discloses a slush molding process wherein the mold is heated by being subjected to hot gases and cooled by being subjected to cooling water and wherein the molds move on an endless conveyor through various stations. There is no suggestion in that patent of the subject inventive concept of utilizing gas heating of only one mold segment combined with a barrier of heat resistant material for differential heating of the mold for controlling the thickness of the article formed therein to avoid excessive material waste at scrap or trim points on the mold. The above-mentioned U.S. Pat. No. 3,680,629 suggests the use of liquid passages adjacent the mold surface for controlling the temperature of the mold, however, there is no suggestion in that patent of the differential heating method and apparatus of the present invention.

As alluded to above in regard to U.S. Pat. No. 2,588,571, the technique of varying the thickness by differential heating is known in the slush molding art, however, such is accomplished by infrared heating. There has been no recognition in the prior art of the advantages of differentially heating and cooling the surfaces of the mold used in the slush molding process by utilizing gas heating of one mold surface and a thermal barrier of heat resistant material to prevent or significantly reduce heating of an adjacent mold surface. Other processes using hot gas to mold plastic parts are set forth in U.S. Pat. Nos. 3,578,066; 3,590,435; 3,492,307; 3,416,913 and 3,388,429. However, none of the processes use the heat distribution system of the present invention to reduce the waste area in a slush or dry plastisol process.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a diagrammatic view of one embodiment of the subject invention; and

FIG. 4 is an enlarged fragmentary sectional view of a second embodiment of thermal joint in the present invention.

DESCRIPTION OF PREFERRED EMBODIMENT

Figure 1:
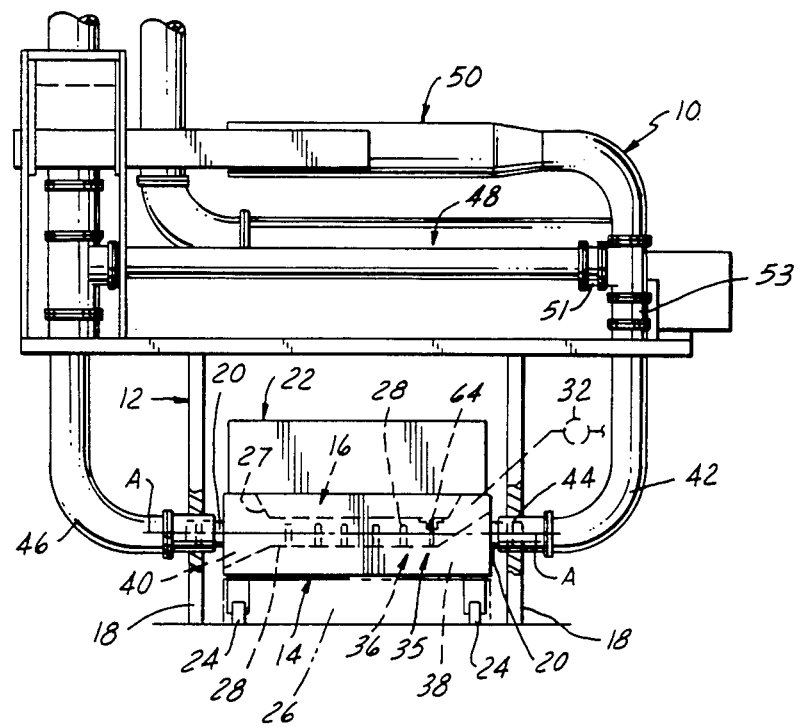
FIG. 1 is a diagrammatic view of a preferred embodiment of an assembly constructed in accordance with the subject invention.

FIG. 1 shows an assembly generally indicated at 10 and constructed in accordance with the subject invention. The assembly 10 includes a stationary pedestal generally indicated at 12 for rotatably supporting a mold support box generally indicated at 14. The pedestal 12 rotatably supports the mold support box 14 for rotation about the axis A-A. The mold support box 14 receives and supports a mold 16. The mold 16 has a mold cavity defining a mold surface.

The pedestal 12 is stationary and includes spaced support legs 18. The support legs 18 rotatably support the mold support box 14 through large circular bearings (not shown) disposed on collars or sleeves 20, which collars or sleeves 20 have accesses or openings through the center thereof, the purpose of which will be explained hereinafter. Suitable drive means for the mold support box 14 are set forth in U.S. Pat. No. 4,217,325 issued Aug. 12, 1980 which is incorporated herein by reference.

The assembly 10 also includes a modular unit generally shown at 22 for supplying gellable material such as plastisol or powder material to the mold 16. The entire unit 22 is supported on a plurality of rollers 24 and in the case of liquid plastisol system includes a dump tank 26. In the case of a drypowder plastisol system excess powder is returned to a powder box of the modular unit 22. The dump tank 26 is movable with the entire unit 22 and is normally disposed under the mold support box 14 when the unit 22 is in the operating position illustrated in FIG. 1 relative to the pedestal 12 for receiving plastisol emptied from the mold 16 as the mold 16 is rotated for dumping or emptying into the dump tank 26. As alluded to above, the mold 16 may be supplied with a different plastisol or the same plastisol of a different color merely by moving the modular unit 22 away from the mold and inserting or placing a different modular unit in position having a different plastisol. Further, and as will become clear hereinafter, the preferred embodiment of the unit 22 includes two different powder boxes for supplying two different plastisols whereby two different plastisols may be sequentially supplied to the mold. This can result in a continuous production cycle utilizing a particular mold 16 to make the same product or article of different colors.

The modular unit 22 includes a powder box plastisol supply and retrieval module for supplying plastisol to the mold surface of the mold 16 and for retrieving plastisol emptied or dumped from the mold 16. The rollers 24 define a conveyance means for facilitating the movement of the unit 22 away from the pedestal 12 and the mold support means 14.

The mold 16 has a molding surface 27 on the interior thereof which is heated for the plastisol to gel. A group of air impingement nozzles or jets 28 are disposed adjacent the mold surface 27 at a first portion 30 of the mold backside of mold 16 for heating the mold surface. Additionally, a cooling fan 32 is disposed at the mold backside surface adjacent second portion 34 thereof for cooling it to a temperature which will reduce or prevent the build-up of gelled material on a waste area of the mold which is separate from the rest of the mold by a thermal insulating joint 35.

A first manifold means 36, including an inlet plenum 38 and a return plenum 40, is supported by the mold support means for distributing gas to and collecting gas from the air impingement jets 28. More specifically, air inlet plenum 38 is disposed at the bottom of the mold support means 14. Inlet fluid conduit 42 passes through seal 44 at sleeve 20 to supply the inlet plenum 38. An outlet conduit 46 passes through a like seal to communicate with return plenum 40. Inlet conduit 42 is connected to hot and cold air systems 48,50 through regulating damper valves 51, 53, respectively, as more particularly set forth both as to structure and function in co-pending United States application Ser. No. 673,810 filed Nov. 11, 1984 with a common assignee.

The mold box, supported by rotary joints at each end, bears the electroform mold 16 in the same manner as in U.S. Pat. No. 4,217,325 and is designed to accommodate a variety of molds. Further, the gellable material can be in the form of a powder as set forth more specifically in U.S. Pat. No. 4,562,025, issued Dec. 31, 1985 for Mold Method and Apparatus for Multi-Color Plastic Shells.

A certain condition must exist between the hot air flow and the mold surface 30 in order to produce the necessary heat-up rates and mold temperatures during the heating cycle. Convective heat transfer coefficients are achieved by forcing the hot air to impinge the back surface of the electroform in a uniform pattern. The convective heat transfer coefficients resulting from this pattern are relatively equal across the entire surface of backside portion 30, thus producing uniform heating.

Figure 2:
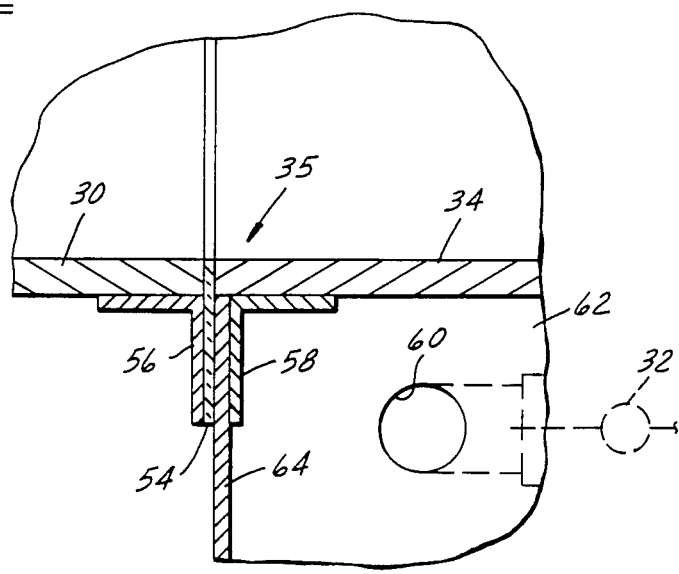
FIG. 2 is an enlarged fragmentary sectional view of a thermal joint in the embodiment of FIG. 1.

As best seen in FIG. 2, the thermal insulating joint 35 in the mold 16 includes a saw cut 52 that separates mold section 30 from the mold section 34 which represents waste area on which no material is to gel. The method of eliminating waste build-up in the cast shells formed on the mold 16 includes the steps of providing a mold for gelling material having separate thermally insulated parts; one for gelling material and the other representing waste segments on the mold. The mold parts are separated by a saw cut which is filled with thermal barrier gasket 54 of castable silicone material. The two parts of the mold are joined by tabs 56, 58 after the barrier 54 is cast into space.

The thermally isolated mold section 34 is also exposed to ambient air through an opening 60 in side plate 62 of the box.

The tabs 56, 58 connect the mold 16 to a divider wall 64 which separates ambient air from hot air in the plenum 38.

As shown diagrammatically in FIG. 3, the method is especially useful when the waste area, represented by surfaces 66, 68 are not in the line of draw from a a powder box 70. Gellable material, will dump into the mold cavity to coat heated surfaces 71, 72, 74 as the powder box 70 and mold are rotated. The waste surfaces 66, 68 are isolated by a divider wall 75. The mold is separated into two parts by a saw cut 76 filled with a cast silicone barrier 78. Tabs 80, 82 on legs 84,86 join a first mold part 88 having surfaces 71, 72, 74 thereon to a second mold part 90 having surfaces 66, 68 thereon. Divider wall 75 is connected to the mold by the tabs 80, 82 to separate a hot air plenum 94 from an ambient air or fan-cooled plenum 96. Consequently, the waste surfaces remain cool and the gellable material will not be deposited on waste surfaces which results in a net saving of material by use of the method and apparatus of the present invention.

Alternatively, as seen in FIG. 4, the thermal joint can be formed as an extruded H-section seal 100 of any suitable heat transfer resistant material which fills a saw cut between mold wall sections 102, 104. The H-section seal includes a center segment 106 filling the saw cut and a pair of oppositely facing spaced legs 108, 110 that capture the exposed ends 112, 114 of the wall sections 102, 104 to form a heat insulating cover thereover, as well as a physical connection therebetween. In this embodiment, an air opening wall 116 abuts against the leg 110.

The embodiments of the invention in which an exclusive property or privilege is claimed are defined as follows:

1. A method for molding an article of heat gellable material in a mold comprising the steps of: separating the mold into two parts separated by a gap; filling the gap with heat transfer resistant material; directing heated air across the backside of part of the mold to maintain the temperature of the mold surface at a first predetermined temperature to gel material deposited thereon; and exposing the thermally insulated part of the mold to air at ambient temperature or lower; gelling a predetermined thickness of the gellable material over the heated mold part, removing non-gelled material from the mold, and raising the heated mold to a temperature sufficient to raise the temperature of the mold surface to a cure temperature for curing the material gelled thereover.

2. A method as set forth in claim 1, further heating the first part of the mold to a temperature in the range of 250° F. to 450° F. for gelling the gellable material over the one area of the mold surface, and thereafter heating the same area of the mold surface to a temperature in the range of 350° F. to 450° F. for the curing of the gelled material.

3. An assembly for molding an article of gellable material comprising; a mold having first and second mold parts, a thermal insulating joint means connecting said first and second parts to prevent conductive heat transfer therebetween, means to direct heated air from across the backside surface of one part for raising the temperature of the first mold part to a gelling temperature, means for supplying ambient air to a second mold part to assist in maintaining it at a non-gelling temperature below that required to gel any appreciable thickness of material thereon.

4. In an assembly as set forth in claim 3, said thermal insulating joint including a saw cut completely separating said first and second mold parts, and heat insulating gasket means filling said gap.

5. In an assembly as set forth in claim 4, mold support means supporting said mold, an air opening in said mold support means to said second part, manifold means supported by said mold support means for distributing heated air to and from the first mold part and a divider wall contacting said gasket means to separate said manifold means from the air opening to said second part.

6. An assembly as set forth in claim 5, a first conduit in communication with said manifold means, and means for allowing relative movement between said conduit and said mold support means.

7. In an assembly as set forth in claim 5, a gellable material supply and retrieval means for supplying gellable material to said mold and for retrieving gellable material emptied from said mold.

8. In an assembly as set forth in claim 3, said thermal insulating joint means including an H-section gasket of thermal insulating material, each of said mold parts having an exposed edge, each of said exposed edges being captured by one end of the H-section gasket to form a heat shield envelope around the exposed ends and to join the first and second mold parts.

* * * * *